United States Patent
Hashimoto et al.

(10) Patent No.: US 7,341,799 B2
(45) Date of Patent: Mar. 11, 2008

(54) SEPARATOR FROM A FUEL CELL HAVING FIRST AND SECOND PORTIONS OF DIFFERENT MATERIALS

(75) Inventors: Keiji Hashimoto, Aichi-ken (JP); Yukihiro Suzuki, Toyota (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 335 days.

(21) Appl. No.: 10/632,401

(22) Filed: Jul. 31, 2003

(65) Prior Publication Data

US 2004/0028980 A1 Feb. 12, 2004

(30) Foreign Application Priority Data

Aug. 9, 2002 (JP) ............................. 2002-232895

(51) Int. Cl.
*H01M 2/02* (2006.01)
(52) U.S. Cl. ............................. 429/34; 429/28; 428/457
(58) Field of Classification Search .................. 429/34, 429/35, 38; 428/457, 469, 323, 344
See application file for complete search history.

(56) References Cited

U.S. PATENT DOCUMENTS 6,326,096 B1 12/2001 Virkar et al.

FOREIGN PATENT DOCUMENTS

| EP | 1 098 380 A1 | 5/2001 |
|---|---|---|
| EP | 1098380 | * 5/2001 |
| EP | 1 160 900 A2 | 12/2001 |
| JP | 01-093062 | 4/1989 |
| JP | 05-036425 | 2/1993 |
| JP | 06-111827 | 4/1994 |
| JP | 09-063600 | 3/1997 |
| JP | 10-154521 | 6/1998 |
| JP | 10-228914 | 8/1998 |
| JP | 11-126620 | 5/1999 |
| JP | 2000-058080 | 2/2000 |
| JP | 2000-058085 | 2/2000 |
| JP | 2000-164229 | 6/2000 |
| JP | 2000-294256 A | 10/2000 |
| JP | 2001-093538 | 4/2001 |
| JP | 2001-297777 | 10/2001 |

* cited by examiner

*Primary Examiner*—Raymond Alejandro
(74) *Attorney, Agent, or Firm*—Fish & Richardson P.C.

(57) ABSTRACT

A separator 10 for a fuel cell is formed by bonding a first separator member 11 facing to an anode electrode AE and a second separator member 12 facing to a cathode electrode CE. A material for forming the first separator member 11 is a chrome alloy that has reduced elution of metal ion even under a power generating environment of the fuel cell, while a material for forming the second separator member is a nickel alloy that has a characteristic of being difficult to form a thick oxide coating layer on its surface. The separator 10 is manufactured in a low-cost and is capable of reducing a deterioration in performance of a fuel cell.

15 Claims, 7 Drawing Sheets

SEPARATOR FROM A FUEL CELL HAVING FIRST AND SECOND PORTIONS OF DIFFERENT MATERIALS

BACKGROUND OF THE INVENTION

1. Field of the Invention

The present invention relates to a separator for a fuel cell and a fuel cell provided with the same.

2. Description of the Prior Arts

Various separators for a fuel cell have conventionally been proposed. Many separators made of a metal have been designed so far in addition to those made of carbon. It is needless to say that a strength not less than a specified amount is required in view of its structure and material for withstanding the use as the separator. However, the required point as the separator is not only the quality with respect to the strength. A variation per hour due to the deterioration of the material forming the separator must be small even under an environment where a power generation is executed by causing a chemical reaction between two kinds of gas under high temperature. The deterioration of the separator has an adverse effect on an electrolyte film or a catalyst, resulting in reducing the power generation efficiency.

A technical expert involving the separator for a fuel cell has repeated trials and errors to find a suitable material for the separator or for the surface treatment so far. As a result, several kinds of material have been known to be suitable to some degree to the separator. One of them is disclosed in Japanese Unexamined Patent Application No. HEI 10-228914. This application discloses that a press molding is performed to a stainless steel to form an evagination section for passing a gas and a gold plating is partially provided on the surface of the evagination section that is in contact with each electrode.

A gold plating is stabilized from a viewpoint of a material, and has a small variation per hour and also has a reduced contact resistance in case where it comes into contact with a cathode electrode. Therefore, it is excellent when used as the surface treatment on the separator at the cathode side. However, when the gold plating is used as the partial surface treatment on the separator at the anode side, an elution of metal ion from the section having no gold plating cannot be avoided, thereby entailing a problem of deteriorating a performance of the fuel cell. Further, when the gold plating is provided all over the separator at the anode side because of this problem, high cost of the separator becomes a problem that cannot be avoided.

On the other hand, Japanese Unexamined Patent Application No. 2000-294256 discloses a separator for a fuel cell utilizing a ferrite stainless. This separator can prevent the elution of metal ion when coming in contact with the anode electrode, but it is impossible to prevent the increase in contact resistance at the cathode electrode side, thereby also not avoiding the deterioration in the performance of the cell. As described above, any one of the separators designed by the conventional technique does not show excellent performance even in case where it is arranged at the anode electrode side and at the cathode electrode side.

The inventor of the present invention has repeated research on the separator for a fuel cell and found that a mechanism causing a performance deterioration of the fuel cell due to the deterioration of the separator is different between at the anode electrode side and at the cathode electrode side. Specifically, at the anode electrode side, metal ion of the material of the separator is eluted and mixedly included as a contaminant into an electrolyte film or catalyst layer, thereby causing the performance deterioration of the fuel cell. Further, condensed water contained in a hydrogen gas introduced to the anode electrode side becomes a path of metal ion, thereby spreading the elution of metal ion. On the other hand, it has been found that, at the cathode electrode side, an oxide coating layer is grown on the surface of the separator to thereby increase the contact resistance between the cathode electrode and the separator, which induces the performance deterioration of the fuel cell.

SUMMARY OF THE INVENTION

The present invention is accomplished for eliminating the subjects of the conventional technique based upon the above-mentioned result of my research, and aims to provide a low-cost separator for a fuel cell capable of reducing a deterioration in performance of a fuel cell and a fuel cell provided with this separator. A first invention provides a separator for a fuel cell provided with a first surface facing to an anode electrode at one side and a second surface facing to a cathode electrode at the other side, wherein a material for forming the first surface and a material for forming the second surface are made different from each other.

According to the configuration of the first invention in which a material for forming the first surface and a material for forming the second surface are made different from each other, a most preferable material can be selected with respect to each electrode in accordance with a mechanism of each electrode of deteriorating the performance of the fuel cell, thereby being capable of providing a separator for a fuel cell capable of preventing a performance deterioration of the fuel cell.

A first detailed configuration in the first invention provides a separator for a fuel cell configured by bonding a first separator member facing to the anode electrode and a second separator member facing to the cathode electrode, wherein a material for forming the first separator member and a material for forming the second separator member are made different from each other.

According to the first detailed configuration wherein a material for forming the first separator member and a material for forming the second separator member are made different from each other, a most preferable material can be selected with respect to each electrode in a metal separator used for a water-cooled fuel cell having provided with a cooling water path between the first separator member and the second separator member. Therefore, this configuration can provide a separator for a fuel cell capable of preventing the performance deterioration of the fuel cell.

A second detailed configuration in the first detailed configuration provides a separator for a fuel cell wherein the material for the first separator member is a chrome alloy, while the material for the second separator member is a nickel alloy.

According to the second detailed configuration wherein the material for the first separator member is a chrome alloy, while the material for the second separator member is a nickel alloy, the first separator member and the second separator member can be made of a material that is difficult to deteriorate with respect to each electrode, thereby being capable of providing a separator for a fuel cell that can prevent the performance deterioration of the fuel cell.

A third detailed configuration in the first invention provides a separator for a fuel cell configured by bonding a first separator member facing to the anode electrode and a second separator member facing to the cathode electrode, wherein a surface treatment is provided on the surface of the first separator member facing to the anode electrode and on the surface of the second separator member facing to the cathode electrode, wherein a material of the surface treatment provided on the first separator member and a material of the surface treatment provided on the second separator member are made different from each other.

According to the third detailed configuration in which a material for the surface treatment provided on the first separator member and a material for the surface treatment provided on the second separator member are made different from each other, a most preferable material can be selected with respect to each electrode, thereby being capable of providing a separator for a fuel cell that can prevent the performance deterioration of the fuel cell.

A fourth detailed configuration in the first invention provides a separator for a fuel cell, wherein the surface treatment provided on the first separator member is a gold plating and the surface treatment provided on the second separator member is a tin plating.

According to the fourth detailed configuration wherein the surface treatment provided on the first separator member is a gold plating and the surface treatment provided on the second separator member is a tin plating, each of the first separator member and the second separator member has a surface treatment provided thereon using a material that is difficult to deteriorate with respect to each electrode. Therefore, this configuration can provide a separator for a fuel cell capable of preventing the performance deterioration of the fuel cell.

A fifth detailed configuration in the third detailed configuration provides a separator for a fuel cell, wherein the surface treatment provided on the surface facing to the cathode electrode is provided only on the surface of the second separator member that is in contact with the cathode electrode.

According to the fifth detailed configuration wherein the surface treatment provided on the surface facing to the cathode electrode is provided only on the surface of the second separator member that is in contact with the cathode electrode, the deterioration of the separator with respect to the cathode electrode can be prevented, and further, the material for the surface treatment provided on the second separator member can be saved. Therefore, this configuration can provide a low-cost separator.

A sixth detailed configuration in the first invention provides a separator for a fuel cell configured by bonding a first separator member facing to the anode electrode and a second separator member facing to the cathode electrode, wherein a surface treatment is provided on one of the surface of the first separator member facing to the anode electrode and the surface of the second separator member facing to the cathode electrode, wherein the surface treatment provided on one of the surfaces of the first separator member and the second separator member is made different from a material forming the other one of the first separator member and the second separator member.

According to the sixth detailed configuration wherein the surface treatment provided on one of the surfaces of the first separator member and the second separator member is made different from a material for forming the other one of the first separator member and the second separator member, a most preferable material can be selected with respect to each electrode. Therefore, this configuration can provide a separator for a fuel cell capable of preventing the performance deterioration of the fuel cell.

A second invention provides a fuel cell provided with a separator for a fuel cell formed by bonding a first separator member facing to an anode electrode and a second separator member facing to a cathode electrode, wherein a material for forming the first separator member and a material for forming the second separator member are made different from each other, and a dried fuel gas is supplied between the anode electrode and the first separator member.

According to the second invention wherein a material for forming the first separator member and a material for forming the second separator member are made different from each other, and a dried fuel gas is supplied between the anode electrode and the first separator member, a most preferable material can be selected with respect to each electrode and an elution of metal ion from the separator caused by condensed water contained in the fuel gas can be prevented, thereby being capable of preventing the performance deterioration of the fuel cell.

A seventh detailed configuration in the first invention provides a separator for a fuel cell configured by providing a surface treatment at one side of a base, wherein the material for forming the first surface is one of a material for forming the base and a material of the surface treatment, while the material for forming the second surface is the other one of the material for forming the base and the material of the surface treatment.

According to the seventh detailed configuration wherein a surface treatment is provided at one side of a base and the material for forming the base and the material for the surface treatment are made different from each other, a most preferable material can be selected with respect to each electrode, thereby being capable of preventing the performance deterioration of the fuel cell.

An eighth detailed configuration in the seventh detailed configuration provides a separator for a fuel cell wherein the material for forming the first surface is a chrome alloy for forming the base, while the material for forming the second surface is a tin plated on the base.

According to the eighth detailed invention wherein the material for forming the first surface is the base made of a chrome alloy, while the material for forming the second surface is the tin plating provided on the base, the first surface and the second surface can be made of a material that is difficult to deteriorate with respect to each electrode. Therefore, this configuration can provide a separator for a fuel cell capable of preventing the performance deterioration of the fuel cell.

A ninth detailed configuration in the seventh detailed configuration provides a separator for a fuel cell wherein the material for forming the second surface is a nickel alloy for forming the base, while the material for forming the first surface is a gold plated on the base.

According to the ninth detailed configuration wherein the material for forming the second surface is the base made of a nickel alloy, while the material for forming the first surface is the gold plating provided on the base, the first surface and the second surface can be made of a material that is difficult to deteriorate with respect to each electrode. Therefore, this configuration can provide a separator for a fuel cell capable of preventing the performance deterioration of the fuel cell.

A tenth detailed configuration in the eighth detailed configuration provides a separator for a fuel cell wherein the tin is plated only on the surface that is in contact with the cathode electrode.

According to the tenth detailed configuration wherein the tin plating is provided only on the surface that is in contact with the cathode electrode, the deterioration of the separator with respect to the cathode electrode can be prevented, and further, the material for the surface treatment provided on the base can be saved. Therefore, this configuration can provide a low-cost separator.

A third invention provides a fuel cell comprising a separator for a fuel cell configured by providing a surface treatment at one side of a base wherein one of the base and the surface treatment faces to an anode electrode while the other one of the base and the surface treatment faces to a cathode electrode and each material of the base and the surface treatment is made different from each other, wherein a dried fuel gas is supplied between the separator for a fuel cell and the anode electrode.

According to the third invention wherein the separator for a fuel cell is provided in which each material of the base and the surface treatment is made different from each other and a dried fuel gas is supplied between the separator for a fuel cell and the anode electrode, a most preferable material can be selected with respect to each electrode and an elution of metal ion from the separator caused by condensed water contained in the fuel gas can be prevented, thereby being capable of preventing the performance deterioration of the fuel cell.

A fourth invention provides a fuel cell comprising a first separator member facing to an anode electrode arranged at one side of an electrolyte film and a second separator member facing to a cathode electrode arranged at the other side of the electrolyte film, wherein a material for forming the first separator member and a material for forming the second separator member are made different from each other.

According to the fourth invention wherein a material for forming the first separator member facing to an anode electrode and a material for forming the second separator member facing to a cathode electrode are made different from each other, a most preferable material can be selected with respect to each electrode in accordance with a mechanism of each electrode of deteriorating the performance of the fuel cell, thereby being capable of preventing the performance deterioration of the fuel cell.

An eleventh detailed configuration in the fourth invention provides a fuel cell wherein a dried fuel gas is supplied between the anode electrode and the first separator member.

According to the eleventh detailed configuration wherein a dried fuel gas is supplied between the anode electrode and the first separator member, an elution of metal ion from the separator caused by condensed water contained in the fuel gas can be prevented, thereby being capable of preventing the performance deterioration of the fuel cell.

DESCRIPTION OF THE PREFERRED EMBODIMENT

Figure 1:
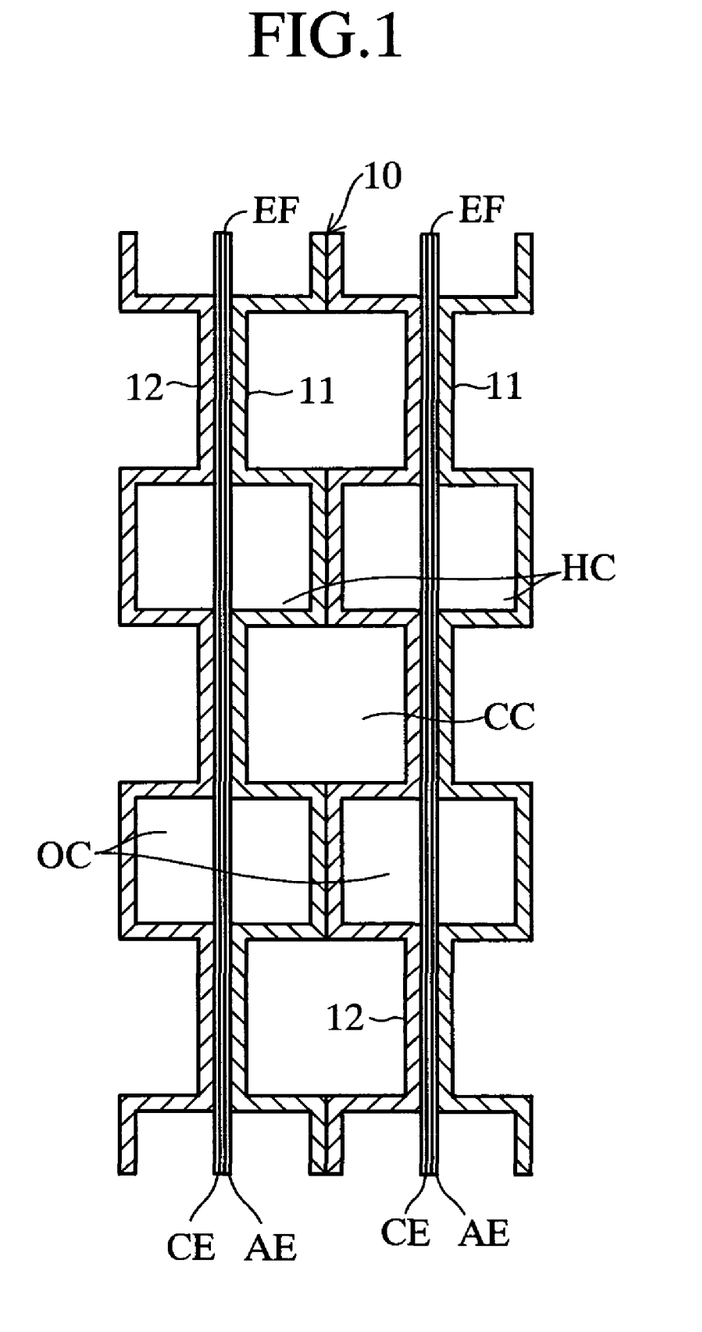
FIG. 1 is a partial sectional view of an inside of a fuel cell stack when a separator for a fuel cell used mainly for a water-cooled fuel cell is applied to the fuel cell stack.

FIG. 1 is a partial sectional view of an inside of a fuel cell stack when a separator 10 for a fuel cell used mainly for a water-cooled fuel cell is applied to the fuel cell stack. The separator 10 is configured by bonding a first separator member 11 and a second separator member 12. In the figure, the metal separators 10 at both of left and right sides are represented by omitting respectively the first separator member 11 and the second separator member 12 at the other side that are originally bonded.

Arranged between two metal separators 10 is an electrolyte film EF via an anode electrode AE and a cathode electrode CE. Formed between the first separator member 11 of the separator 10 and the anode electrode AE are a plurality of fuel gas channels HC to which a fuel gas containing hydrogen is introduced, while formed between the second separator member 12 of the separator 10 and the cathode electrode CE are a plurality of oxidant gas channels OC to which a gas containing oxygen is introduced. A chemical reaction occurs between the fuel gas channels HC and the oxidant gas channels OC arranged via the electrolyte film EF, thereby causing an electrical power generation.

A cooling chamber CC into which cooling water that is a cooling medium for cooling the fuel cell stack is circulated is arranged between the adjacent first separator member 11 and the second separator member 12. It is needless to say that the following configuration may be adopted instead of the above-mentioned configuration such that the second separator member 12 is arranged to be in contact with the anode electrode AE, a plurality of fuel gas channels HC are arranged between the second separator member 12 and the anode electrode AE, the first separator member 11 is arranged to be in contact with the cathode electrode CE and a plurality of oxidant gas channels OC are arranged between the first separator member 11 and the cathode electrode CE.

Figure 2:
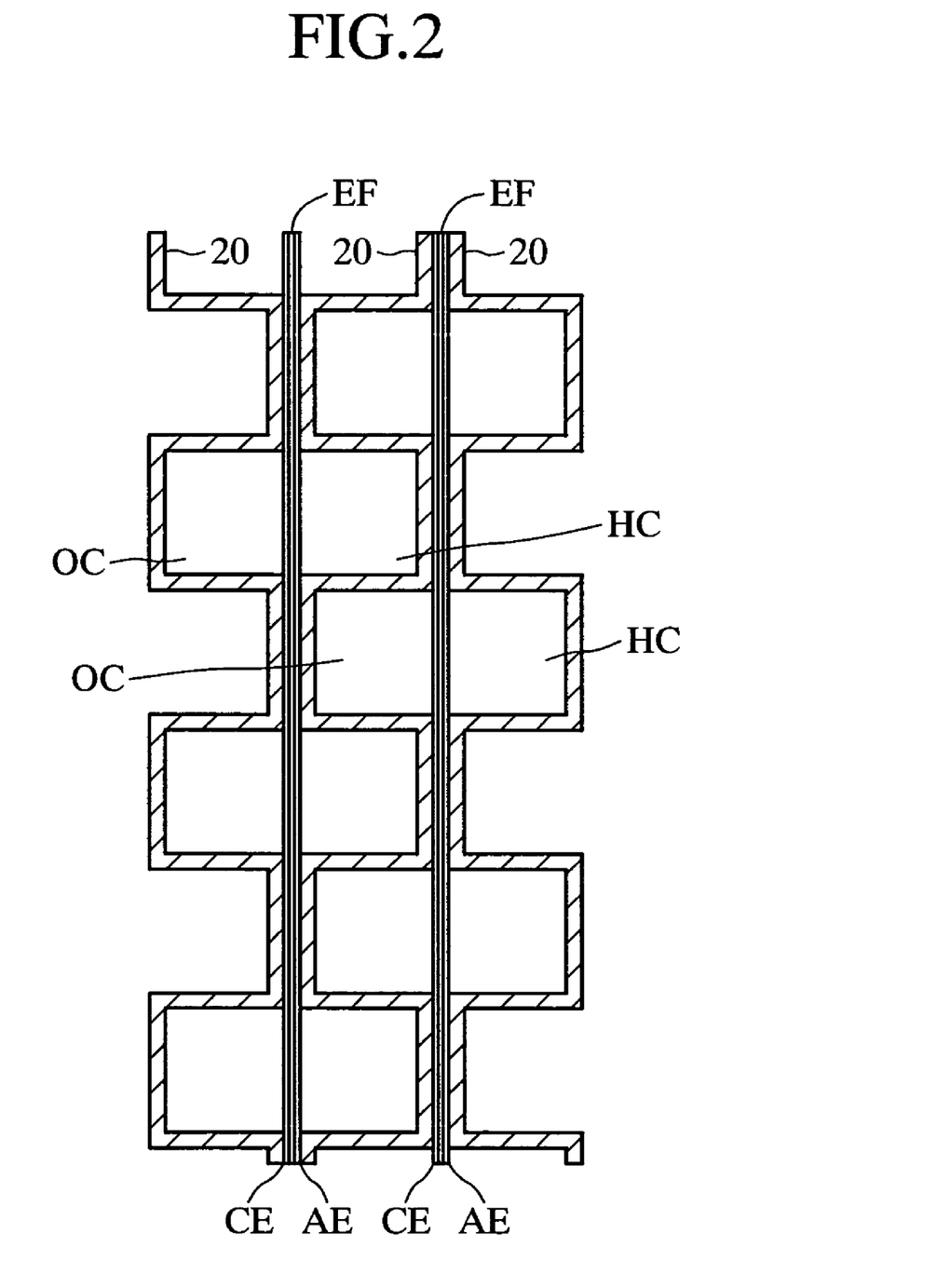
FIG. 2 is a partial sectional view of an inside of a fuel cell stack when a separator for a fuel cell used mainly for an air-cooled fuel cell is applied to the fuel cell stack.

FIG. 2 is a partial sectional view of an inside of a fuel cell stack when a separator 20 for a fuel cell used mainly for an air-cooled fuel cell is applied to the fuel cell stack. The separator 20 is, different from the separator 10 shown in FIG. 1, composed of a single separator member. Arranged between two metal separators 20 is an electrolyte film EF via an anode electrode AE and a cathode electrode CE.

Formed between the separator 20 and the anode electrode AE are a plurality of fuel gas channels HC to which a fuel gas containing hydrogen is introduced, while formed between the separator 20 and the cathode electrode CE are a plurality of oxidant gas channels OC to which a gas containing oxygen is introduced. A chemical reaction occurs between the fuel gas channels HC and the oxidant gas channels OC arranged via the electrolyte film EF, thereby causing an electrical power generation.

The separator 20 used for an air-cooled fuel cell does not have a cooling chamber in which cooling water is circulated and which is formed at the separator 10 used for a water-cooled fuel cell. Heat generated in the air-cooled fuel cell stack is transmitted to the outside of the fuel cell through the separator 20 to thereby be naturally cooled.

It is to be noted that this separator 20 can be used for a water-cooled fuel cell. A water-cooled fuel cell stack is composed by alternately combining the separator 10 and the separator 20, whereupon cooling water is supplied to the separator 10 like a manner of a stepping-stone (at every predetermined number), thereby cooling the stack. It is needless to say that the separator 10 can conversely be used for an air-cooled fuel cell without introducing cooling water into the cooling chamber of the separator 10.

Figure 3:
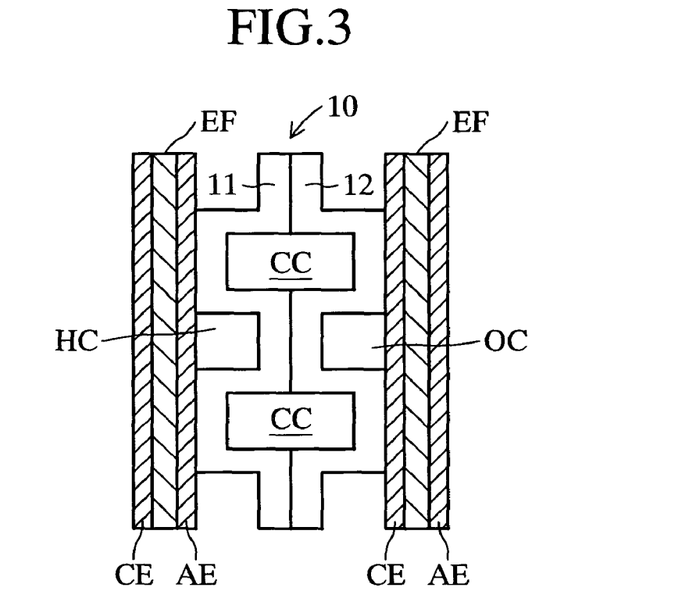
FIG. 3 is a typical view showing a separator for a fuel cell according to a first embodiment of the invention.

FIG. 3 to FIG. 12 are typical views representing each embodiment of the present invention. Explained by using FIG. 3 to FIG.7 are first to ninth embodiments of the invention relating to the separator 10 used for a water-cooled fuel cell. FIG. 3 is a view showing a separator for a fuel cell according to the first embodiment of the invention. In the first embodiment, the first separator member 11 and the second separator member 12 of the separator 10 are formed such that a material for forming the first separator member 11 facing to (coming in contact with) the anode electrode AE is a chrome alloy while a material for forming the second separator member 12 facing to (coming in contact with) the cathode electrode CE is a nickel alloy.

The chrome alloy has reduced elution of metal ion even if it is at the anode electrode AE side under a power generating environment of the fuel cell, whereby it forms a firm passive layer on its surface. Every chrome alloy comprising various composition can be used. However, the first separator member 11 facing to the anode electrode AE is not always made of the chrome alloy in the present invention. A material other than the chrome alloy can be used so long as it does not contain a nickel or the like that easily causes an ion elution and has reduced elution of metal ion even under the power generating environment of the fuel cell.

On the other hand, the nickel alloy has a characteristic of being difficult to form a thick oxide coating layer on its surface even if it is at the cathode electrode CE. Every nickel alloy comprising various composition can be used. However, the second separator member 12 facing to the cathode electrode CE is not always made of the nickel alloy in the present invention. A material other than the nickel alloy can be used so long as it has a characteristic of being difficult to form a thick oxide layer on its surface by suppressing an addition amount of chrome that brings a great growth of the oxide coating layer.

Figure 4:
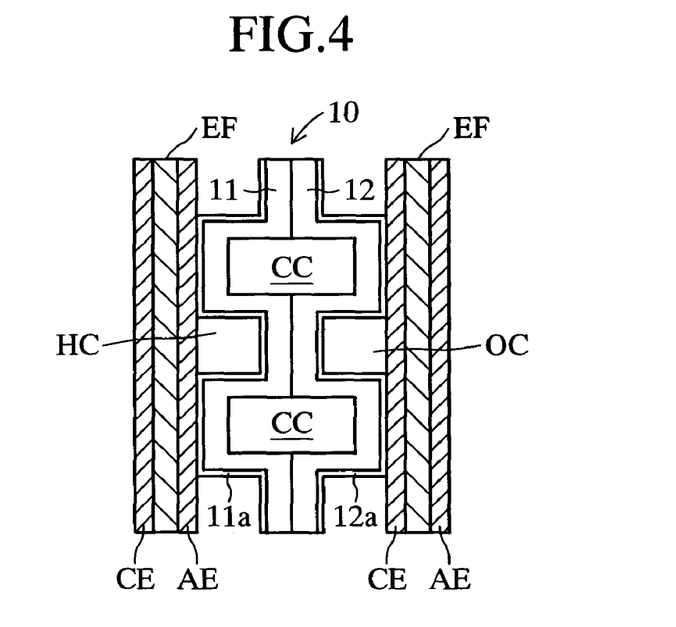
FIG. 4 is a typical view showing a separator for a fuel cell according to a second embodiment of the invention.

FIG. 4 is a view showing a separator 10 for a fuel cell according to the second embodiment. In the second embodiment, the first separator member 11 and the second separator member 12 of the separator 10 are formed such that a gold plating 11a is provided as a surface treatment all over the surface of the first separator member 11 facing to the anode electrode AE while a tin plating 12a is provided as a surface treatment all over the surface of the second separator member 12 facing to the cathode electrode CE.

The gold plating 11a is stabilized and has reduced elution of metal ion even if it is at the anode electrode AE side under the power generating environment of the fuel cell. Every gold plating comprising various composition can be used. However, the first separator member 11 facing to the anode electrode AE does not always have the gold plating as a surface treatment in the present invention. A surface treatment other than the gold plating can be used so long as it is performed by using a material having reduced elution of metal ion. It is to be noted that, in this embodiment, every material can be applied to the first separator member 11 that is a base material to which the surface treatment is performed.

On the other hand, the tin plating has a characteristic of being capable of suppressing the increase in contact resistance due to high conductivity of tin oxide itself even if it is oxidized to form an oxide coating layer at the cathode electrode CE side. Every tin plating comprising various composition can be used. However, the second separator member 12 facing to the cathode electrode CE does not always have the tin plating as a surface treatment. A surface treatment other than the tin plating (e.g., a noble metal plating or the like) can be used so long as it is performed by using a material whose oxide coating layer has high conductivity or that has a characteristic of bringing a small growth of the oxide coating layer. It is to be noted that, in this embodiment, every material can be applied to the second separator member 12 that is a base material to which the surface treatment is performed.

Figure 5:
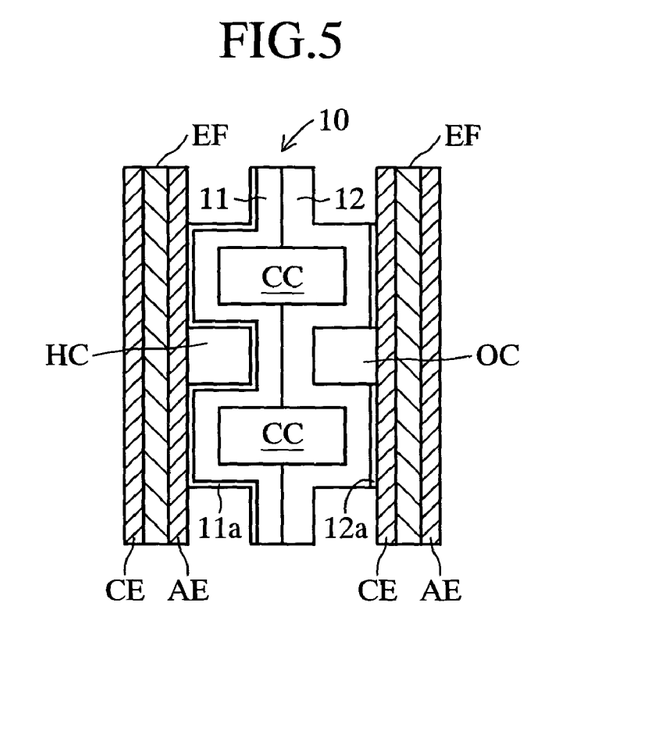
FIG. 5 is a typical view showing a separator for a fuel cell according to a third embodiment of the invention.

FIG. 5 is a view showing a separator 10 for a fuel cell according to a third embodiment of the invention. A different point from the above-mentioned second embodiment is that the tin plating 12a that is the surface treatment provided on the second separator member 12 facing to the cathode electrode CE is provided only on a surface of the second separator member 12 that is in contact with the cathode electrode CE. The other configuration is the same as the second embodiment, so that its explanation is omitted here.

The tin plating 12a is provided only on the surface of the second separator member 12 that is in contact with the cathode electrode CE, thereby affording a low-cost separator 10 compared to the one having the tin plating 12a as the surface treatment provided all over the surface of the second separator member 12. A cost merit is remarkable in particular in case where a noble metal plating is provided on the surface of the second separator member 12 instead of the tin plating 12a.

Figure 6:
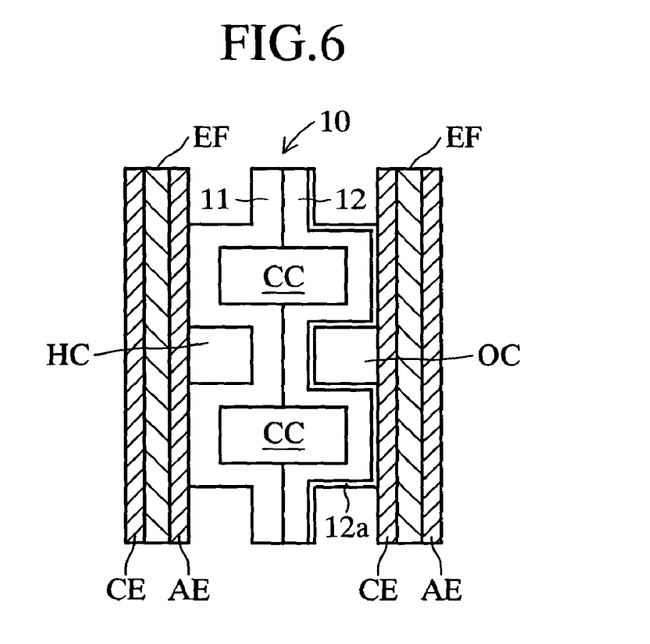
FIG. 6 is a typical view showing a separator for a fuel cell according to a fourth embodiment of the invention.

FIG. 6 is a view showing a separator 10 for a fuel cell according to a fourth embodiment of the invention. In the fourth embodiment, the first separator member 11 and the second separator member 12 of the separator 10 are formed such that a material for forming the first separator member 11 facing to the anode electrode AE is a chrome alloy while the tin plating 12a is provided as a surface treatment all over the surface of the second separator member 12 facing to the cathode electrode CE.

Subsequently considered as a fifth embodiment is a case (not shown) wherein the first separator member 11 and the second separator member 12 of the separator 10 are formed such that the first separator member 11 facing to the anode electrode AE has the gold plating 11a provided all over its surface as shown in FIG. 4 and the second separator member 12 facing to the cathode electrode CE is made of a nickel alloy as shown in FIG. 3. The characteristics of the first separator member 11 and the second separator member 12 are the same as those shown in FIG. 4 and FIG.3, thereby omitting their explanations.

Further, considered as a sixth embodiment is a case (not shown) wherein the first separator member 11 and the second separator member 12 of the separator 10 are formed such that the first separator member 11 facing to the anode electrode AE is made of a chrome alloy as shown in FIG. 3 and the second separator member 12 facing to the cathode electrode CE has the tin plating 12a provided only on the surface that is in contact with the cathode electrode CE as shown in FIG. 5. The characteristics of the first separator member 11 and the second separator member 12 are the same as those shown in FIG. 3 and FIG. 5, thereby omitting their explanations.

Figure 7:
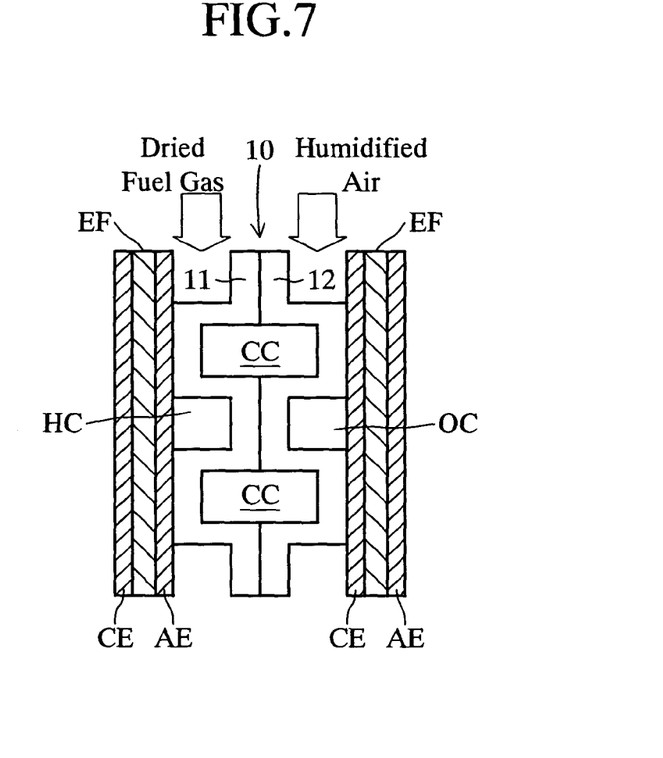
FIG. 7 is a typical view showing a separator for a fuel cell according to a seventh embodiment of the invention.

FIG. 7 is a view showing a fuel cell according to a seventh embodiment of the invention. In the seventh embodiment, a wide range of materials can be applied for forming the first separator member 11 facing to the anode electrode AE of the first separator member 11 and the second separator member 12 composing the separator 10. It is desirable to avoid a nickel alloy that is likely to cause an elution of metal ion. On the other hand, the material for forming the second separator member 12 facing to the cathode electrode CE is the nickel alloy.

The feature of this embodiment lies between the first separator member 11 of the separator 10 and the anode electrode AE. Specifically, the feature lies in that a dried fuel gas is introduced to a plurality of fuel gas channels HC to which a fuel gas containing hydrogen is introduced (humidified air is introduced to the oxidant gas channel OC as usual). In other words, the fuel gas ejected from the fuel gas tank does not go through a humidification tank arranged between the fuel gas tank and the fuel cell but is directed to the fuel gas channels HC of the fuel cell.

In this embodiment, introducing the dried fuel gas into the fuel gas channels HC can prevent the elution of metal ion from the separator caused by condensed water contained in the fuel gas, thereby being capable of preventing the performance deterioration of the fuel cell. Accordingly, the material for forming the first separator member 11 facing to the anode electrode AE is not specifically limited but a wide range of materials can be applied.

Subsequently considered as an eighth embodiment is the case (not shown) wherein, with respect to the one shown in FIG. 7 as the seventh embodiment, the first separator member 11 and the second separator member 12 composing the separator 10 are formed such that the second separator member 12 facing to the cathode electrode CE is changed to the one having the tin plating 12a provided as the surface treatment all over the surface as shown in FIG. 4. The other configurations are the same as those of the seventh embodiment, so that their explanations are omitted here.

Subsequently considered as a ninth embodiment is the case (not shown) wherein, with respect to the one shown in FIG. 7 as the seventh embodiment, the first separator member 11 and the second separator member 12 composing the separator 10 are formed such that the second separator member 12 facing to the cathode electrode CE is changed to the one having the tin plating 12a provided as the surface treatment only on the surface that is in contact with the cathode electrode CE as shown in FIG. 5. The other configurations are the same as those of the seventh embodiment, so that their explanations are omitted here.

Figure 8:
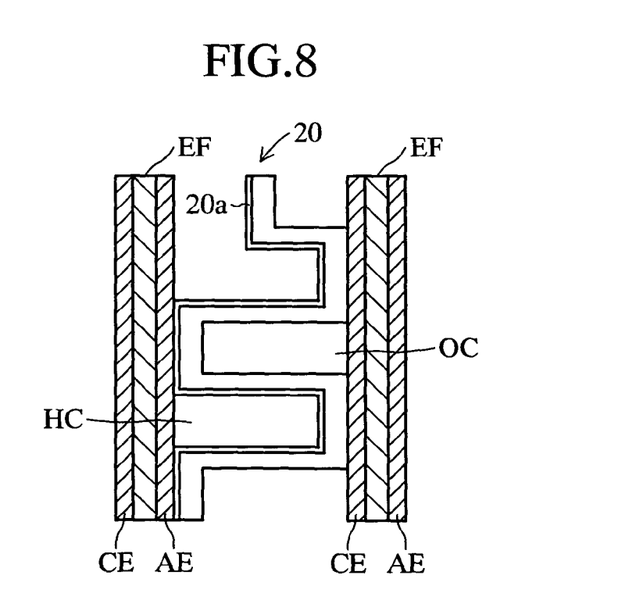
FIG. 8 is a typical view showing a separator for a fuel cell according to a tenth embodiment of the invention.

Subsequently explained with reference to FIG. 8 to FIG. 12 are tenth to fourteenth embodiments of the present invention relating to a separator 20 for a fuel cell used for an air-cooled fuel cell. FIG. 8 is a view showing the separator 20 according to the tenth embodiment of the invention. In the tenth embodiment, a material for forming the separator 20 facing to the cathode electrode CE is the nickel alloy while a gold plating 20a is provided as a surface treatment all over the surface of the separator 20 facing to the anode electrode AE.

The gold plating 20a is stabilized and has reduced elution of metal ion even if it is at the anode electrode AE side under a power generating environment of the fuel cell. Every gold plating comprising various composition can be used. However, the separator 20 facing to the anode electrode AE does not always have the gold plating as a surface treatment in the present invention. A surface treatment other than the gold plating can be used so long as it is performed by using a material having reduced elution of metal ion.

On the other hand, the nickel alloy has a characteristic of being difficult to form a thick oxide coating layer on its surface even if it is at the cathode electrode CE. Every nickel alloy comprising various composition can be used. However, the separator 20 facing to the cathode electrode CE is not always made of a nickel alloy in the present invention. A material other than the nickel alloy can be used so long as it has a characteristic of being difficult to form a thick oxide layer on its surface by suppressing an addition amount of chrome that brings a great growth of the oxide coating layer.

Figure 9:
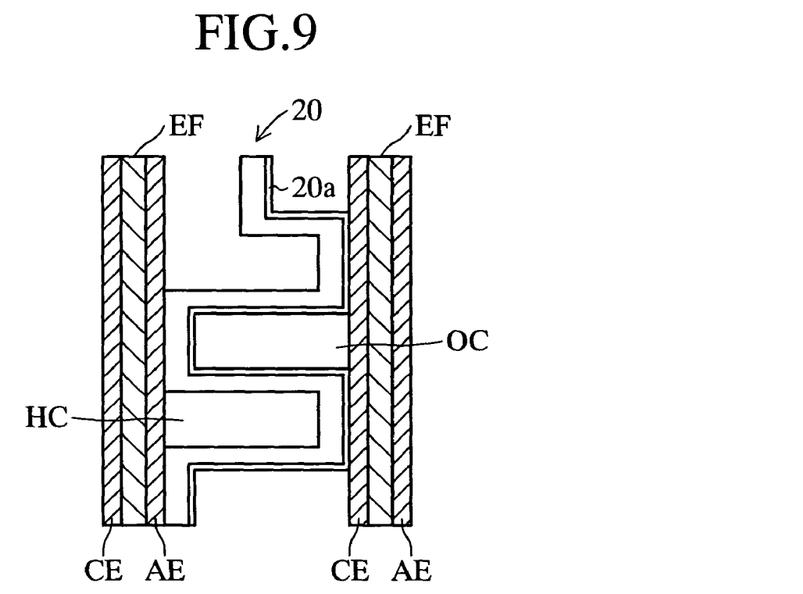
FIG. 9 is a typical view showing a separator for a fuel cell according to an eleventh embodiment of the invention.

FIG. 9 is a view showing a separator 20 according to the eleventh embodiment of the invention. In the eleventh embodiment, a material for forming the separator 20 facing to the anode electrode AE is a chrome alloy while a tin plating 20a is provided as a surface treatment all over the surface of the separator 20 facing to the cathode electrode CE.

The tin plating has a characteristic of being capable of suppressing the increase in contact resistance due to high conductivity of tin oxide itself even if it is oxidized to form an oxide coating layer at the cathode electrode CE side. The separator 20 facing to the cathode electrode CE does not always have the tin plating as a surface treatment. A surface treatment other than the tin plating (e.g., a noble metal plating or the like) can be used so long as it is performed by using a material whose oxide coating layer has high conductivity or that has a characteristic of bringing a small growth of the oxide coating layer.

The chrome alloy has reduced elution of metal ion even if it is at the anode electrode AE side under a power generating environment of the fuel cell, whereby it forms a firm passive layer on its surface. Every chrome alloy comprising various composition can be used. However, the separator 20 facing to the anode electrode AE is not always made of the chrome alloy in the present invention. A material other than the chrome alloy can be used so long as it does not contain a nickel or the like that easily causes an ion elution and has reduced elution of metal ion even under the power generating environment of the fuel cell.

Figure 10:
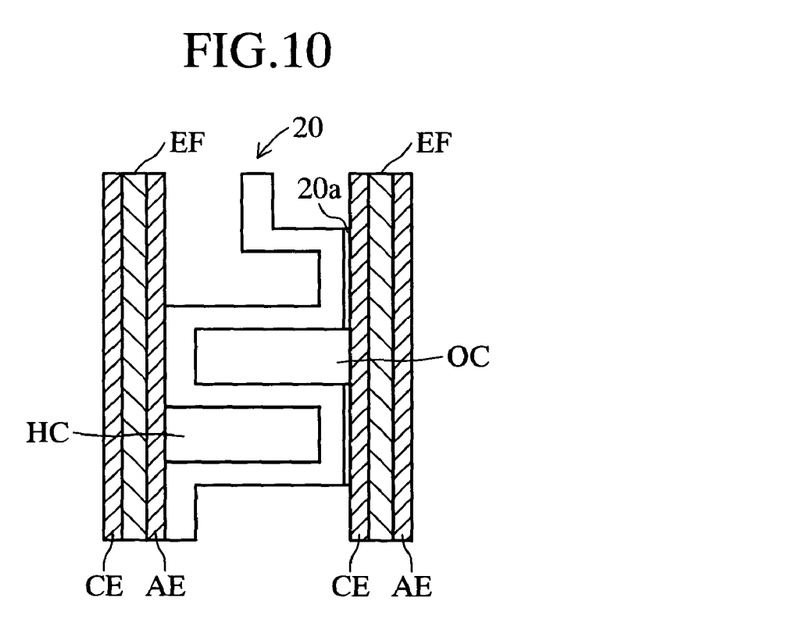
FIG. 10 is a typical view showing a separator for a fuel cell according to a twelfth embodiment of the invention.

FIG. 10 is a view showing a separator 20 according to the twelfth embodiment of the present invention. A different point from the above-mentioned eleventh embodiment is that the tin plating 20a that is the surface treatment provided on the surface of the separator 20 facing to the cathode electrode CE is provided only on a surface of the separator 20 that is in contact with the cathode electrode CE. The other configuration is the same as the eleventh embodiment, so that the explanation thereof is omitted here.

The tin plating 20a is provided only on the surface of the separator 20 that is in contact with the cathode electrode CE in the twelfth embodiment, thereby affording a low-cost separator 20 compared to the one having the tin plating 20a as the surface treatment provided all over the surface of the separator 20. A cost merit is remarkable in particular in case where a noble metal plating is provided on the surface of the separator 20 instead of the tin plating.

Figure 11:
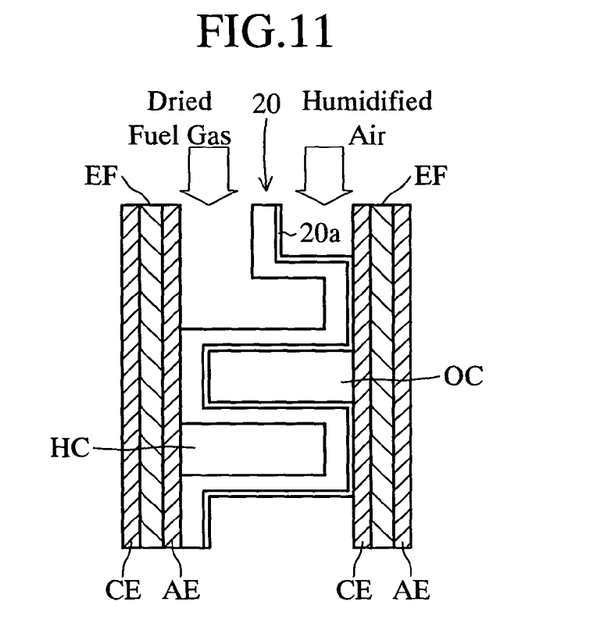
FIG. 11 is a typical view showing a separator for a fuel cell according to a thirteenth embodiment of the invention.

FIG. 11 is a view showing a fuel cell according to a thirteenth embodiment of the invention. In the thirteenth embodiment, a wide range of materials can be applied for forming the separator 20 facing to the anode electrode AE. It is desirable to avoid a nickel alloy that is likely to cause an elution of metal ion. On the other hand, the tin plating 20a is provided as the surface treatment on the surface of the separator 20 facing to the cathode electrode CE.

The feature of this embodiment lies between separator 20 and the anode electrode AE. Specifically, the feature lies in that a dried fuel gas is introduced to a plurality of fuel gas channels HC to which a fuel gas containing hydrogen is introduced (humidified air is introduced to the oxidant gas channel OC as usual). In other words, the fuel gas ejected from the fuel gas tank does not go through a humidification tank arranged between the fuel gas tank and the fuel cell but is directed to the fuel gas channels HC of the fuel cell.

In this embodiment, introducing the dried fuel gas into the fuel gas channels HC can prevent the elution of metal ion from the separator caused by condensed water contained in the fuel gas, thereby being capable of preventing the performance deterioration of the fuel cell. Accordingly, the material for forming the separator 20 facing to the anode electrode AE is not specifically limited but a wide range of materials can be applied.

Figure 12:
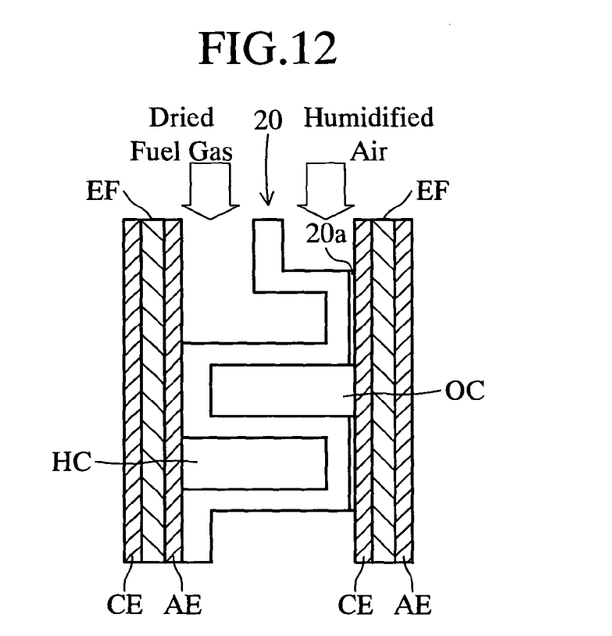
FIG. 12 is a typical view showing a separator for a fuel cell according to a fourteenth embodiment of the invention.

FIG. 12 is a view showing a separator for a fuel cell according to a fourteenth embodiment of the invention. In the fourteenth embodiment, a different point from the above-mentioned thirteenth embodiment is that the tin plating 20a that is the surface treatment on the separator 20 facing to the cathode electrode CE is provided only on the surface of the separator 20 that is in contact with the cathode electrode CE. The other configuration is the same as the thirteenth embodiment, so that the explanation thereof is omitted here.

The tin plating 20a is provided only on the surface of the separator 20 that is in contact with the cathode electrode CE in the fourteenth embodiment, thereby affording a low-cost separator 20 compared to the one having the tin plating 20a as the surface treatment provided all over the surface of the separator 20. A cost merit is remarkable in particular in case where a noble metal plating is provided on the surface of the separator 20 instead of the tin plating.

Subsequently explained as a fifteenth embodiment is a case where the present invention is applied to the one having a fuel cell stack formed by a single cell (power-generating element) (this embodiment is not shown in the figure). The configuration according to the fifteenth embodiment is that the first separator member is provided so as to face to the anode electrode AE arranged at one side of the electrolyte film EF while the second separator member is provided so as to face to the cathode electrode CE arranged at the other side of the electrolyte film EF.

In this configuration, considered configurations include that the material for forming the first separator member facing to the anode electrode AE is a chrome alloy while a material for forming the second separator member facing to the cathode electrode CE is a nickel alloy, or the gold plating is provided as the surface treatment all over the surface of the first separator member while the tin plating is provided as the surface treatment all over the second separator member, or the tin plating is provided only on the surface of the second separator member that is in contact with the cathode electrode CE, or the material for forming the first separator member is a chrome alloy while the tin plating is provided as the surface treatment all over the second separator member, or the material for forming the second separator member is a nickel alloy while a dried fuel gas is introduced to a plurality of fuel gas channels HC between the first separator member and the anode electrode AE (humidified air is introduced to the oxidant gas channel OC as usual) or the like.

According to the configuration of the invention in which a material for forming the separators 10 and 20 facing to the anode electrode AE and a material for forming the separators 10 and 20 facing to the cathode electrode CE are made different from each other, a most preferable material can be selected with respect to each electrode in accordance with a mechanism of each electrode of deteriorating the performance of the fuel cell, thereby being capable of providing a separator for a fuel cell that can prevent the performance deterioration of the fuel cell.

As for usable materials for the base of the separators 10 and 20 and usable materials for the surface treatment, every metallic or non-metallic material can be used for those facing to the anode electrode AE so long as it has reduced elution of metal ion even at the anode electrode AE side under a power generating environment of the fuel cell. Particularly suitable non-metallic materials include a carbon material such as diamond-carbon or the like or a ceramics material such as TiN or the like. Further, every metallic or non-metallic material can be used for those facing to the cathode electrode CE so long as it has a characteristic of being difficult to form a thick oxide layer on its surface by suppressing an addition amount of chrome that brings a great growth of the oxide coating layer even at the cathode electrode CE side, or it has a high conductivity of its oxide coating layer.

In particular, the chrome alloy is used for the base as a material suitable to the separator facing to the anode electrode AE or the gold plating is provided as the surface treatment, whereby the elution of metal ion is small even at the anode electrode AE side under the power generating environment of the fuel cell, thereby being capable of suppressing the performance deterioration of the fuel cell. Further, the nickel alloy is used for the base as a material suitable to the separator facing to the cathode electrode CE, whereby a thick oxide coating layer is difficult to be formed on its surface even at the cathode electrode CE side, thereby being capable of suppressing the performance deterioration of the fuel cell. Alternately, the tin plating is provided as the surface treatment, whereby the increase in the contact resistance can be reduced due to high conductivity of tin oxide itself even if an oxidation is caused at the cathode electrode CE side to thereby form an oxide coating layer. As a result, the performance deterioration of the fuel cell can be reduced.

If the dried fuel gas is supplied to the fuel gas channels HC in the fuel cell using the separator 10 or 20 having the configuration of the invention, an elution of metal ion from the separator caused by condensed water in the fuel gas can be prevented, thereby being capable of further reducing the performance deterioration of the fuel cell.

What is claimed is:

1. A separator for a polymer electrolyte fuel cell, comprising:
   a first portion, having a first surface facing to an anode electrode at one side of the separator; and a second portion, having a second surface facing to a cathode electrode at the other side of the separator;
   wherein said first portion is formed of a first material that contains no nickel and has a characteristic of reducing elution of metal ions and the second portion is formed of a second material, different than the first material, where said second material contains no chrome and has a characteristic making it difficult to form a thick oxide coating layer.

2. A separator for a polymer electrolyte fuel cell claimed in claim 1, wherein the separator is composed of a first separator member for forming the first surface and a second separator member for forming the second surface, wherein the first separator member is formed by a material containing no nickel and having a characteristic of reducing elution of metal ions and the second separator member is formed by a material containing no chrome and having a characteristic of being difficult to form a thick oxide coating layer.

3. A separator for a fuel cell claimed in claim 2, wherein the material for the first separator member is a nonmetallic material, while the material for the second separator member is a metallic material.

4. A separator for a fuel cell claimed in claim 3, wherein the non-metallic material is ether one of a carbon material and a ceramics material.

5. A separator for a fuel cell claimed in claim 1 configured by bonding a first separator member for forming the first surface and a second separator member for forming the second surface, wherein the first surface is plated by a material having a characteristic of reducing elution of metal ions and the second surface is plated by a material having a characteristic making it difficult to form a thick oxide coating layer.

6. A separator for a fuel cell claimed in claim 5, wherein the plated material on the first surface is a gold and the plated material on the second surface is tin.

7. A separator for a fuel cell claimed in claim 5, wherein the plating treatment on the second surface is provided only on the second surface that is in contact with the cathode electrode.

8. A separator for a fuel cell claimed in claim 1 configured by bonding a first separator member for forming the first surface and a second separator member for forming the second surface, wherein the first surface is plated by a material having a characteristic of reducing elution of metal ions and the second separator member is formed by a material having a characteristic making it difficult to form a thick oxide coating.

9. A separator for a fuel cell claimed in claim 1 configured by providing a plating treatment at only one side of a base, wherein the base is formed by one material of a first material having a characteristic of reducing elution of metal ions and a second material having a characteristic making it difficult to form a thick oxide coating layer, while the one side is plated by other material of the first and second materials.

10. A separator for a fuel cell claimed in claim 9, wherein the first material is a non-metallic material, while the second material is a metallic material.

11. A separator for a fuel cell claimed in claim 10, wherein the non-metallic material is a carbon.

12. A separator for a fuel cell claimed in claim 9, wherein the first material is a chrome alloy, while the second material is tin.

13. A separator for a fuel cell claimed in claim 9, wherein the plated side of the base is the second surface of the separator and the second material is plated only on the second surface that is in contact with the cathode electrode.

14. A separator for a fuel cell claimed in claim 9, wherein the first material is a nickel alloy, the second material is a gold, and the plated side of the base is the first surface of the separator.

15. A separator for a polymer electrolyte fuel cell as claimed in claim 1, wherein the first material is selected from the group consisting of chrome alloy, gold, carbon and ceramics, while the second material is selected from the group consisting of nickel alloy, tin and noble metals except for gold.

* * * * *